US00RE46331E

(19) United States
(12) Reissued Patent
Savage

(10) Patent Number: US RE46,331 E
(45) Date of Reissued Patent: Mar. 7, 2017

(54) PANTS

(71) Applicant: lululemon athletica canada inc., Vancouver (CA)

(72) Inventor: Shannon Savage, Vancouver (CA)

(73) Assignee: LULULEMON ATHLETICA CANADA INC., Vancouver (CA)

(21) Appl. No.: 29/483,494

(22) Filed: Feb. 28, 2014

Related U.S. Patent Documents

Reissue of:
(64) Patent No.: Des. 654,661
Issued: Feb. 28, 2012
Appl. No.: 29/396,448
Filed: Jun. 30, 2011

(51) LOC (10) Cl. ..... 02-02
(52) U.S. Cl.
USPC ..... D2/742
(58) Field of Classification Search
USPC ..... D2/731, 738, 742; 2/227, 228, 238, 242
(Continued)

(56) References Cited

U.S. PATENT DOCUMENTS 4,625,336 A * 12/1986 Derderian ..... A41D 13/0015 2/227
D300,383 S * 3/1989 Yasuda ..... D2/742
(Continued)

*Primary Examiner* — Phillip S Hyder
(74) *Attorney, Agent, or Firm* — Conneely PC; Joseph Conneely

(57) CLAIM

The ornamental design for pants, as shown and described.

DESCRIPTION

*This application is an application for reissue of U.S. Design Pat. No. D654,661, which issued on Feb. 28, 2012 from U.S. Design patent application Ser. No. 29/396,448, filed Jun. 30, 2011, the entire contents of which are hereby incorporated by reference.*

*Notice: More than one reissue application has been filed for the reissue of U.S. Pat. No. D654,661. The reissue applications are application Ser. No. 29/483,494 (the present application), divisional reissue application Ser. No. 29/518,388, and divisional reissue application Ser. No. 29/559,022, all of which are reissues of U.S. Design Pat. No. D654,661.*

FIG. 1 is a front view of pants according to a first embodiment of the design;
FIG. 2 is a rear view thereof;
FIG. 3 is a right side view thereof;
FIG. 4 is a left side view thereof;
FIG. 5 is a front perspective view thereof;
FIG. 6 is a rear view of pants according to a second embodiment of the design, the front, left side, and front perspective views being the same as FIGS. 1 and 4-5, respectively; [and,]
FIG. 7 is a right side view thereof[.];
*FIG. 8 is a front view of pants according to a third embodiment of the design;*
*FIG. 9 is a rear view thereof;*
*FIG. 10 is a right side view thereof;*
*FIG. 11 is a left side view thereof; and,*
*FIG. 12 is a front perspective view thereof.*

The symbol depicted in FIGS. 6-7 forming part of the claimed design is a registered trademark of Lululemon Athletica Canada Inc.

*The portions of the pants depicted by broken line FIGS. 8 through 12 form not part of the third embodiment.*

1 Claim, 12 Drawing Sheets

Figure 1:
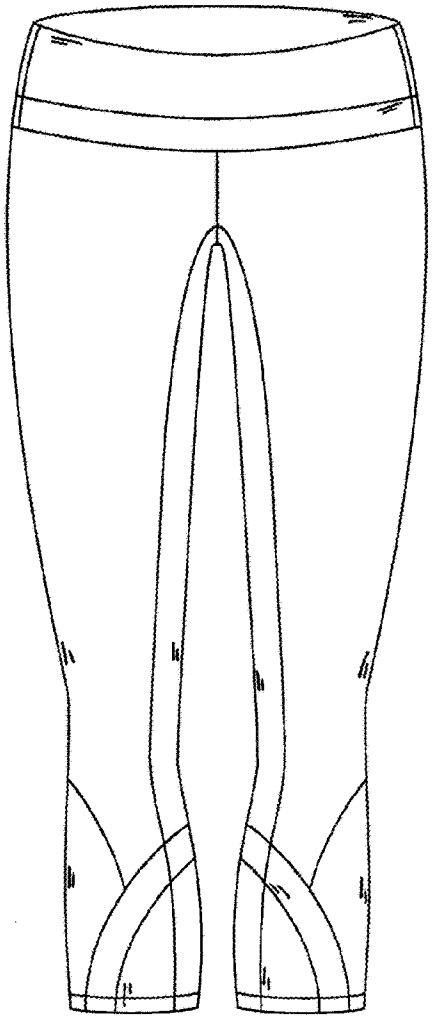
Figure 2:
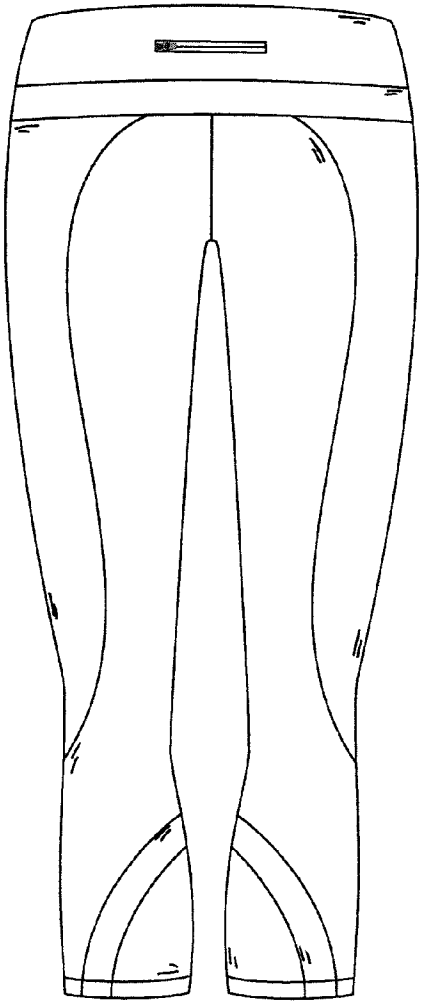
Figure 3:
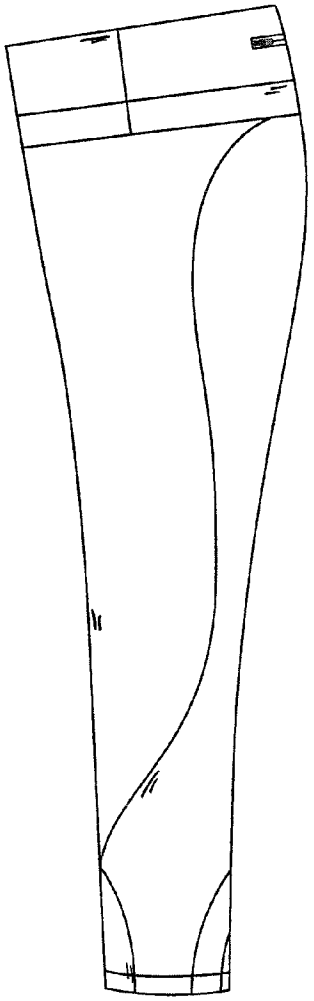
Figure 4:
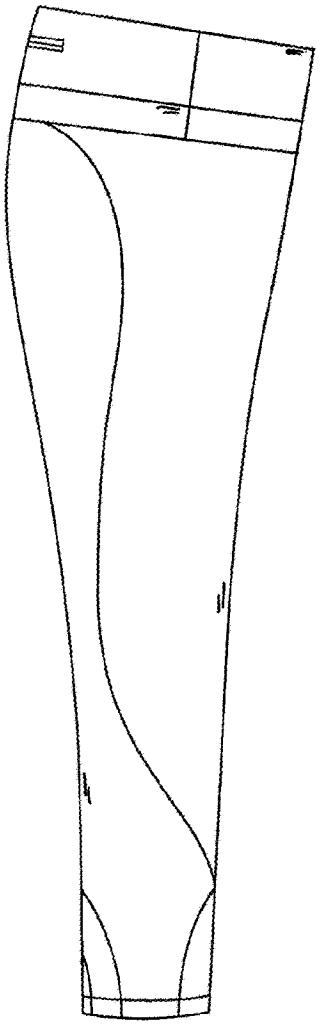
Figure 5:
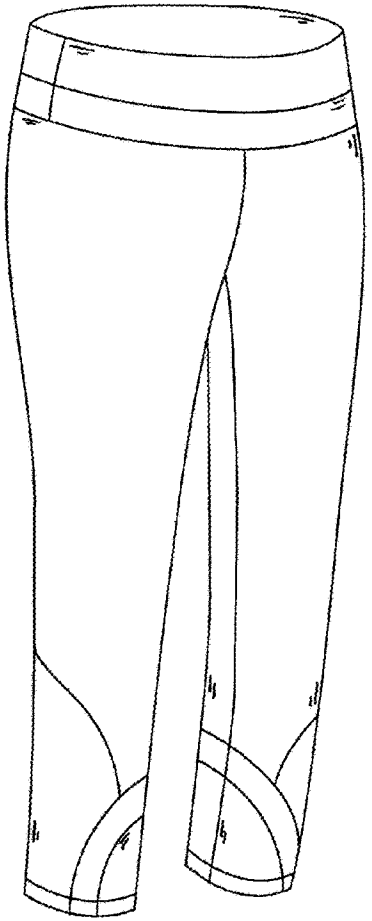
Figure 6:
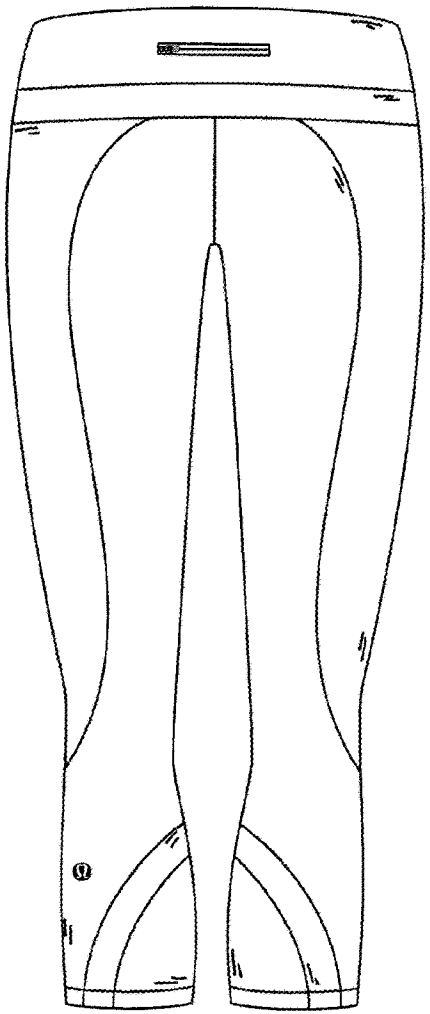
Figure 7:
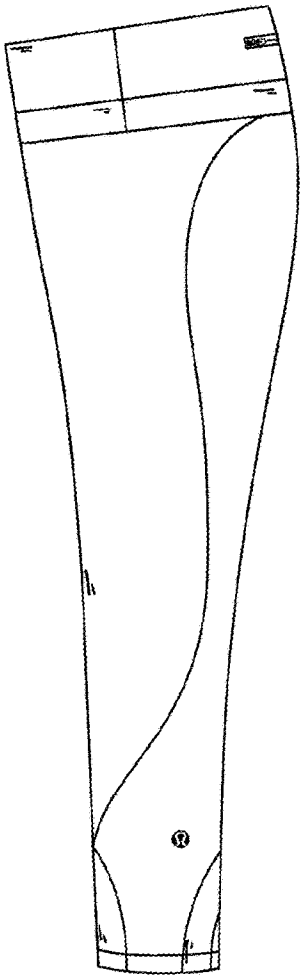

Matter enclosed in heavy brackets [ ] appears in the original patent but forms no part of this reissue; matter printed in italics indicates the additions made by reissue.

(58) Field of Classification Search

CPC ..... A41D 13/0015; A63B 21/055

See application file for complete search history.

(56) References Cited

U.S. PATENT DOCUMENTS

| | | | | | |
|---|---|---|---|---|---|
| 5,109,546 | A * | 5/1992 | Dicker | A41D 13/0015 | 2/227 |
| 5,367,708 | A * | 11/1994 | Fujimoto | A41D 13/0015 | 2/22 |
| D404,538 | S * | 1/1999 | Fujii | D2/742 | |
| D413,008 | S * | 8/1999 | Fujii | D2/731 | |
| D460,602 | S * | 7/2002 | Tanaka | D2/742 | |
| D465,078 | S * | 11/2002 | Tanaka | D2/742 | |
| D465,315 | S * | 11/2002 | Tanaka | D2/742 | |
| D465,900 | S * | 11/2002 | Tanaka | D2/742 | |
| D466,674 | S * | 12/2002 | Tanaka | D2/742 | |
| D507,857 | S * | 8/2005 | Ota | D2/742 | |
| D513,830 | S * | 1/2006 | Ota et al. | D2/731 | |
| D517,279 | S * | 3/2006 | Fujii | D2/731 | |
| D532,958 | S * | 12/2006 | Kent | D2/742 | |
| 7,229,390 | B2 * | 6/2007 | Fujii | A41D 13/0015 | 2/2.16 |
| 7,506,274 | B2 * | 3/2009 | Zhang et al. | 715/854 | |
| 7,526,929 | B2 * | 5/2009 | Takamoto | A41D 13/0015 | 66/177 |
| D608,527 | S * | 1/2010 | Chionna | D2/742 | |
| 7,730,552 | B2 * | 6/2010 | Ota | A41D 13/0015 | 2/227 |
| D619,784 | S * | 7/2010 | Kanada et al. | D2/742 | |
| D622,480 | S * | 8/2010 | Chionna | D2/742 | |
| 7,814,576 | B2 * | 10/2010 | Nakazawa | 2/227 | |
| 7,861,319 | B2 * | 1/2011 | Torry | 2/69 | |
| 7,941,871 | B1 * | 5/2011 | Jorgensen | 2/238 | |
| 7,945,970 | B2 * | 5/2011 | Belluye et al. | 2/69 | |
| D641,134 | S * | 7/2011 | Zarabi | D2/712 | |
| D641,539 | S * | 7/2011 | Zarabi | D2/701 | |
| D648,922 | S * | 11/2011 | Evans et al. | D2/742 | |
| 2001/0014981 | A1 * | 8/2001 | Fairhurst | A41D 7/00 | 2/69 |
| 2004/0255358 | A1 * | 12/2004 | Ota | A41D 13/0015 | 2/69 |
| 2008/0083055 | A1 * | 4/2008 | Onda | 2/455 | |
| 2009/0293167 | A1 * | 12/2009 | Kottler | 2/23 | |

* cited by examiner

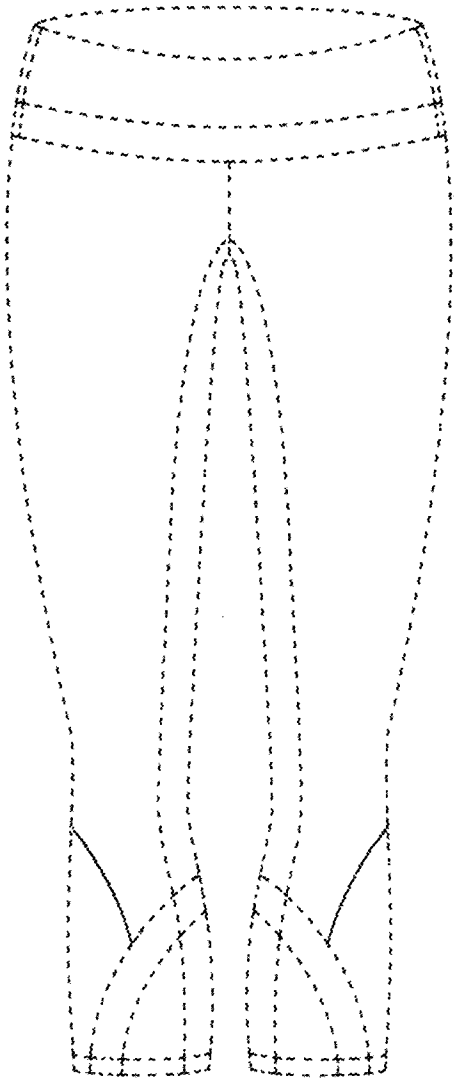
Fig. 8 (New)

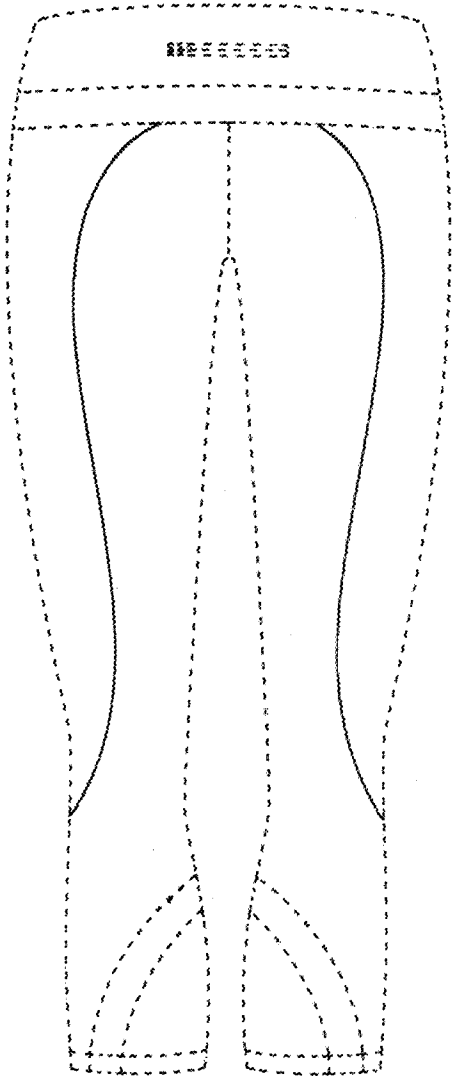
Fig. 9 (New)

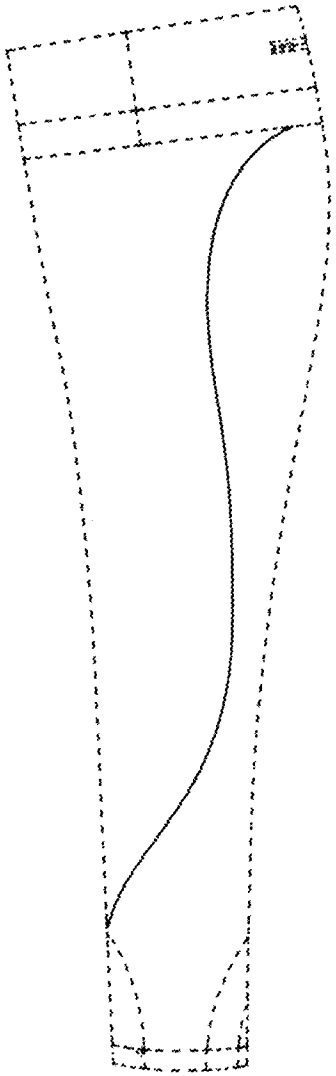
Fig. 10 (New)

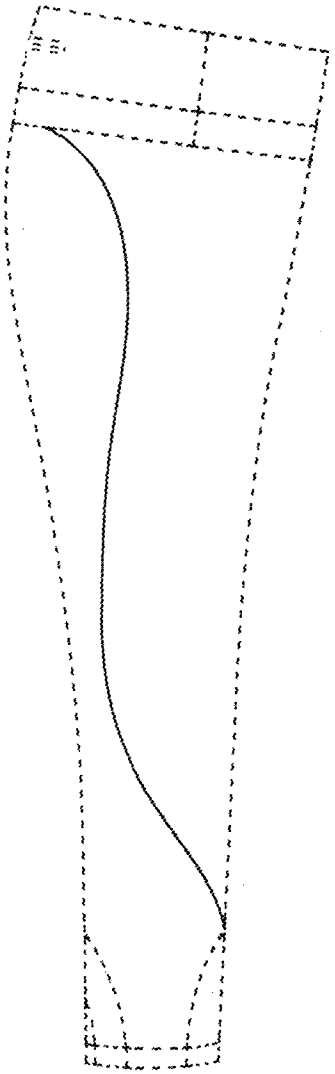
Fig. 11 (New)

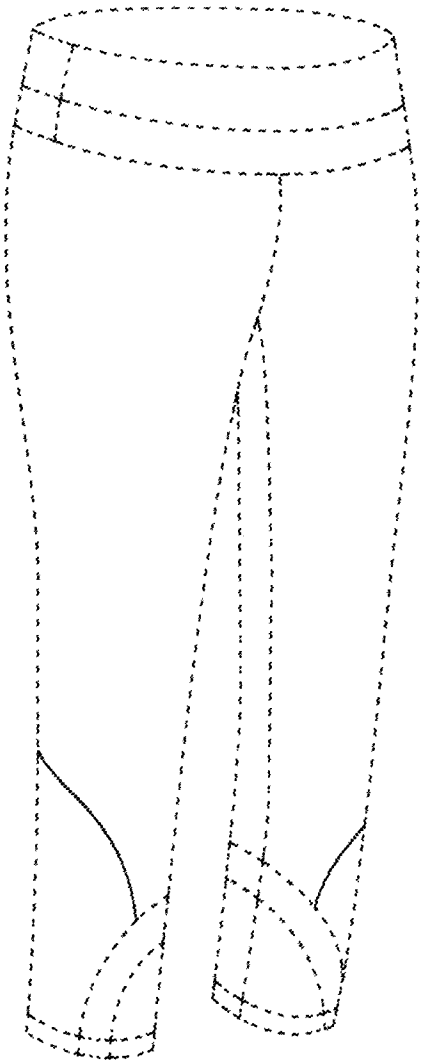
Fig. 12 (New)